Patented Apr. 23, 1940

2,197,800

UNITED STATES PATENT OFFICE 2,197,800

REACTION OF ALIPHATIC HYDROCARBONS WITH SULPHUR DIOXIDE AND CHLORINE AND PRODUCTS THEREOF

Clyde O. Henke and William H. Lockwood, Wilmington, Del., assignors to E. I. du Pont de Nemours & Company, Wilmington, Del., a corporation of Delaware No Drawing. Application June 30, 1938
Serial No. 216,840

15 Claims. (Cl. 260—504)

This invention relates to new and improved surface-active agents prepared from petroleum hydrocarbons and to methods of preparing the same.

This invention has as an object the preparation of surface-active agents from cheap sources of raw materials. A further object is the preparation of detergent and wetting agents from petroleum hydrocarbons. A still further object is to obtain detergent and wetting agents by a method involving a few simple steps. A still further object is to obtain such compounds by an economical process involving simple apparatus. Still other objects will appear hereinafter.

The above and other objects are accomplished by treating petroleum hydrocarbons possessing certain characteristics which are set forth hereinafter with a gaseous mixture of sulphur dioxide and chlorine. The product so obtained is then hydrolyzed and neutralized with a concentrated solution of a strong alkali metal base. The crude product is purified by diluting the same with water whereupon the unreacted oil separates to the top and the aqueous layer containing an alkali metal salt of the sulphonated oil is drawn off. The solution may be further purified if desired, for example, by extraction with an oil-dissolving solvent and diluted to a standardized strength or dried. Any of the usual methods for drying detergents may be resorted to. Spray or drum drying procedures give good results. There results from this operation a surface active product of excellent wetting and detergent properties.

It has been discovered that from the standpoint of good yields of the water-soluble products it is desirable to refine the petroleum products or fractions before they are reacted with the gaseous mixture of sulphur dioxide and chlorine. Thus refining may be performed in various manners. As examples of such methods, mention is made of treatment with a strong poly-basic mineral acid, e. g. sulphuric acid, oleum or phosphoric acid, which may be followed by a treatment with alkali, by chilling and separating out the solidified hydrocarbons, by fractionating petroleum and subectjing certain fractions to purification by treatment with sulphuric acid or oleum, by treatment with fuller's earth or other absorptive bodies, and in general in any one or a combination of several of the above and other methods of purification.

The invention will be further illustrated but is not intended to be limited by the following examples:

EXAMPLE I

A fraction of a crude oil from a paraffinic base boiling between 284° C. and 306° C. was treated with a gaseous mixture of sulphur dioxide and chlorine in the ratio of three parts of sulphur dioxide to one part of chlorine at a temperature of 45°–50° C. in the presence of light for four hours and then hydrolyzed with a hot solution of concentrated caustic soda. About ten percent of a water-soluble product was recovered.

EXAMPLE II

An oil of similar source as that described in Example I and similar boiling range but which had been subjected to treatment with sulphuric acid and oleum and washed with alkali and then dried, was treated with a mixture of sulphur dioxide and chlorine and hydrolyzed according to the manner set forth in Example I, and gave a yield of seventy percent of water-soluble product.

In a similar manner a crude oil from a Pennsylvania oil and fractions of furnace oils from Michigan crude oil, in both of which paraffin hydrocarbons predominate, were subjected to the above treatment and yielded only small amounts of water-soluble products. In contrast, refined kerosene and white oils gave good yields of water-soluble surface-active products. These products are useful as mercerizing assistants, wetting agents, dispersing agents, rewetting agents, detergents, penetrating agents, softening agents, and other uses where surface-active compounds are desired.

It has been found that a further characterization beyond that of purifying is desirable to produce wetting agents, rewetting agents, detergents, etc. of high efficiency. Thus, it has been found that when the starting material after the aforesaid purification have physical characteristics falling within the limits given below excellent products may be obtained. The preferred oils of this invention have properties within the following approximate limits:

| | Min. | Max. |
|---|---|---|
| Distillation range, A. S. T. M. (760 mm.) °C | 250 | 360 |
| Saybolt Universal viscosity, 100° F seconds | 32 | 52 |
| Specific gravity 15.5°/15.5° C.* | 0.7610 | 0.8200 |
| Refractive index 20° C | 1.4250 | 1.4500 |

*Compared with water at 15.5° C.

In connection with the temperature range in the above table at least 90% of the hydrocarbon should distill within the range of 255° to 360° C.

Still more valuable products are obtained if the oil falling within the above limits does not react or is not discolored by treatment with 98% sulphuric acid at room temperature.

It has been found that still better water-soluble surface-active materials may be obtained if the starting hydrocarbons have characteristics falling within the following limits:

|  | Min. | Max. |
|---|---|---|
| Distillation range, A. S. T. M. (760 mm.) °C | 251 | 330 |
| Saybolt Universal viscosity, 100° F seconds | 33 | 45 |
| Specific gravity 15.5°/15.5° C | 0.7670 | 0.800 |
| Refractive index 20° C | 1.4280 | 1.4400 |

If the last mentioned oils do not discolor when treated with 98% sulphuric acid at room temperatures, surface-active materials are obtained in better yields and of better quality.

Excellent detergent and wetting agents are obtained by the process if the starting oils have characteristics falling within the following limits:

|  | Min. | Max. |
|---|---|---|
| Distillation range, A. S. T. M. (760 mm.) °C | 260 | 320 |
| Saybolt Universal viscosity, 100° F seconds | 35 | 40 |
| Specific gravity 15.5/15.5° C | 0.7670 | 0.7800 |
| Refractive index 20° C | 1.4300 | 1.4375 |

Improved surface-active products are obtained from oils with characteristics falling within the above limits if, in addition, they are not discolored by treatment with 98% sulphuric acid at room temperatures, and the last mentioned specific oils represent the preferred embodiment of the invention.

The following examples are illustrative of the preferred embodiment.

Example III

A refined petroleum oil having the following characteristics:

Initial boiling point (A. S. T. M.) °C 266
Dry point °C 312
Saybolt Universal viscosity, 100° F. secs 36.5
Specific gravity 15.5/15.5° C. 0.8036
Refractive index 20° C. 1.4423 was treated in the following manner. Into 400 parts of the oil were passed a gaseous mixture of 687 parts of sulphur dioxide and 354 parts of chlorine at a uniform rate over a period of three and one-half hours. The temperature of the reacting mass was 90°–102° C. The reaction was catalyzed by the light from a 60-watt electric light bulb suspended to one side of the flask. The weight of the reaction mass increased 230 parts during this time. The reaction mass was then poured into 500 parts of 30% sodium hydroxide which had previously been heated to 75° C. The heat of the reaction raised the temperature to 90°–95° C. where it was held by cooling. The crude hydrolyzed mass was alkaline to phenolphthalein. The product was diluted with an equal amount of water and allowed to stand overnight, during which time an oily layer separated on top. The lower layer was drawn off and extracted with petroleum ether to remove a further portion of unreacted oil. The product was a good detergent.

Example IV

A refined petroleum white oil having the following characteristics:

Initial boiling point (A. S. T. M.) °C 283
Dry point (A. S. T. M.) °C 324
Saybolt Universal viscosity 100° F. secs 37.2
Specific gravity 20/15.5° C. 0.7789
Refractive index 20° C. 1.4351 was treated in the following manner. Through 300 parts by weight of the oil was bubbled a gaseous mixture of 513 parts of sulphur dioxide and 196 parts of chlorine at a uniform rate over a period of two and three-quarters hours. The temperature of the reaction mass was kept at 45°–50° C. during the time and the reaction was accelerated by the light from an electric light bulb (100 watt) suspended near the flask. At the end of the time the reaction mass had gained 207 parts by weight. The reaction mass was hydrolyzed by pouring into 540 parts of 30% sodium hydroxide which had previously been heated to 60° C. The heat from the hydrolysis raised the temperature to 90°–95° C. where it was kept by cooling during the duration of the reaction. The resultant crude product was alkaline to phenolphthalein. This product was then diluted with an equal weight of water and extracted with carbon tetrachloride to remove unreacted oil. After heating to remove that part of the solvent which was emulsified in the solution, the product exhibited excellent wetting, rewetting, and detergent powers.

Example V

A hydrocarbon with the following characteristics:

Initial boiling point (A. S. T. M.) °C 286.0
Dry point (A. S. T. M.) °C 291.0
Saybolt Universal viscosity 100° F. secs 36.8
Specific gravity 20°/15.5° C. 0.7752
Refractive index 20° C. 1.4349 was treated by the methods of Examples III and IV. The product had excellent wetting, rewetting, and detergent properties.

The new compounds of this invention dissolve to give a clear solution in water and may be used as such. They may be dried in any desired manner with or without an inorganic diluent or assistant such as sodium sulphate, any of the sodium phosphates, sodium chloride, bentonite, or other materials customarily added to textile assistants to increase their value. For example, the solution obtained according to the second example may be drum-dried in the conventional manner to yield a white flaky product of excellent appearance.

Example VI

Into 100 g. of an oil having the following characteristics:

Distillation range A. S. T. M. deg 298.5–302.5
Specific gravity 25°/15.5° C. 0.7751
Refractive index 20° C. 1.4340
Saybolt Universal viscosity 100° F. secs 37.9 was passed a gaseous mixture of 126 g. of sulphur dioxide and 110 g. chlorine at a uniform rate over a period of one hour and fifteen minutes. The temperature was kept at 20–25° and the reaction was illuminated by a 60 watt incandescent light. The reaction product was poured into 174 g. of 30% sodium hydroxide. The so-formed sulphonic acids were purified by diluting with an equal volume of water, whereupon a small layer of unreacted oil separated on top. The product was an excellent detergent.

The product obtained before the hydrolysis and neutralization reaction was carried out was similar to the products obtained at this stage according to the previous examples and contained hydrocarbon sulphonyl chlorides, chloro hydrocarbon sulphonyl chlorides and chlorhydrocarbons.

After saponification, the products were also quite complex in nature and contained the salts of the corresponding sulphonic acids.

The method of solubilizing these preferred hydrocarbons does not necessarily have to conform to the conditions cited in the examples, as these are merely our preferred conditions. For example, we have varied the ratio of gases introduced from 1 mol of sulphur dioxide to 1 mol of chlorine to 5 mols of sulphur dioxide to 1 mol of chlorine. An excess of sulphur dioxide to chlorine is preferable in many cases, and it is often preferable to operate with 2 to 4 mols of sulphur dioxide to 1 mol of chlorine and particularly 2.5 to 3.5 mols of sulphur dioxide to 1 mol of chlorine. With some oils, such as heptadecane or cetane, a ratio of 1 to 2 mols of sulphur dioxide to 1 mol of chlorine is preferable.

The temperature at which we react the mixed gases with the hydrocarbons may be varied over a wide range. For instance, temperatures from about 30° C. to about 110° C. have been found to be effective. Lighter colored products are obtained when the temperature is held below 70° C. The reaction proceeds faster when the temperature is above 40° C. It is preferable to operate in the range of 40° C. to 55° C. and more particularly at 45°–50° C.

The rate of flow has been varied so that from 2 to 7 hours have been required to complete the reaction when comparable amounts of oil were involved. It is preferable to arrange the flow so that 2 to 4 hours are required to complete the reaction. The reaction may be run in the presence or absence of light, in which latter case a much longer time is necessary to complete the reaction. It is preferable to illuminate the reaction mass with a suitable light such as an incandescent electric light, an arc light such as a carbon arc, metal or metal salt cored carbon arcs, or a vapor lamp such as a mercury or rare gas lamp. The amount of mixed gases passed through the oil has an effect upon the product. It is preferable to let the reaction continue until the oil has gained a weight equivalent to the weight of one mol of sulphur dioxide plus one mol of chlorine per mol of the hydrocarbon being treated. The crude neutralized product may or may not be separated from the unreacted oil before extraction. The extraction may be made with petroleum ether, carbon tetrachloride, trichlorethylene, or any other oil-dissolving solvent. Or if desired, after separating the oily layer from the diluted neutralized material the extraction step may be omitted and the remaining oil may be removed by steam distillation or the solution dried without further removing the oil, the process of drying acting in a manner similar to steam distillation.

This invention is not to be limited to the hydrolysis procedure set forth in the examples. For instance, the concentration of caustic soda used for hydrolyzing the reaction product obtained by treating a hydrocarbon with a gaseous mixture of sulphur dioxide and chloride may be varied from 5% to 50%. The reaction is somewhat slower with the more dilute caustic soda solutions and almost instantaneous with the more concentrated solutions. Other alkali metal hydroxides such as potassium, caesium, etc., may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, β-naphthyl amine, etc. Thus, the amine salts of chlor-alkyl or alkyl sulphonic acids may be obtained. Also, the strong quaternary ammonium bases such as tetra-methyl-ammonium-hydroxide and tetra-ethyl-ammonium-hydroxide may be used for the hydrolysis. The resulting products would be the tetra-methyl-ammonium salt or the tetra-ethyl-ammonium salt of the hydrocarbon sulphonic acid.

Water-miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol, and its ethers and esters, e. g. ethylene glycol, diethyl ether, dimethyl ether, etc.

The products obtained when the starting oil has been so refined as to have characteristics falling within the limits set forth above, have surface-active properties greatly superior to the products obtained from oils which may have part but not all of the said desired characteristics. For example, an oil may have the desired distillation range but have a specific gravity higher than the desired maximum. Products obtained from this oil will be less efficient detergents and wetting agents. Likewise, a poorer yield of water-soluble product may be obtained. Similarly, an oil may have a specific gravity which falls within the desired range but have a boiling range lower than that desired. The product obtained from this oil will have greatly inferior detergent and wetting properties.

In order to obtain an oil which has characteristics within the limits which we have disclosed it may be refined by the known refining methods, i. e. treatment with sulphuric acid and oleum, treatment with absorbing earths, distillation, fractionation, chilling, crystallization, etc. During this refining the most, if not all, of the aromatic and unsaturated constituents of the oil are removed and to a greater or lesser extent the naphthenic constituents. The oil remaining is then predominantly paraffinic in nature. The distillation range specified will cover only those straight chain or normal hydrocarbons of about 13 to 20 carbon atoms and an almost infinite variety of branched chain hydrocarbons of more than 13 carbon atoms. However, it is believed that when petroleum hydrocarbons are refined to our specifications that a mixture of predominately straight chain hydrocarbons is obtained.

It is not necessary to obtain the hydrocarbons falling within the range of our desired specifications from petroleum. For example, n-hexadecane or cetane may be obtained by dehydrating cetyl alcohol to obtain cetene and then hydrogenating the cetene to cetane. The water-soluble product obtained from cetane by one of the methods disclosed above gives a product possessing superior wetting and detergent properties. Other synthetic hydrocarbons such as pentadecane, tetradecane, octadecane, heptadecane, etc., fall within the limits of our preferred materials and may be solubilized by the aforesaid process to yield valuable surface-active products.

While the limits which we have specified will define, in general, the hydrocarbons which we prefer to use as starting materials for the production of surface-active bodies, some hydrocarbons which have characteristics falling somewhat outside the range specified will give surface-active bodies of appreciable value, although not as valuable as our preferred products.

The differences between products prepared from starting materials falling within the narrow limits of this invention and those which do not are in some instances quite pronounced. This will be more particularly brought out below wherein a number of comparisons are set forth in detail. The products, as will be apparent from the following discussion, in general have better surface active properties.

For example, when the product from an oil whose specific gravity, refractive index, and viscosity fell within the limits set forth but whose boiling range fell largely below the initial boiling point limit set forth was compared with the product from an oil whose characteristics all fell within the specified limits for detergent action, the former required 16 g. per liter of water to accomplish the same washing effect as was effected by 2.5 g. per liter of water of the latter. When the wetting powers of the two were compared on cotton skeins by the Draves-Clarkson method, the former required 2 g. per liter to give sinking in 25 seconds while the latter required only 0.8 g. per liter.

When an oil whose distillation range and viscosity fell within the limits specified but whose specific gravity and refractive index were higher than the maximum limit was treated according to the method described in the above examples a yield of about 10% of water-soluble product was obtained, whereas an oil whose characteristics all fell within the limits prescribed gave a yield of 70-75% water-soluble product.

Thus, while it is known that water-soluble and surface-active products may be obtained by treating hydrocarbons with sulphur dioxide and chlorine, it will be apparent from the above that superior detergents, wetting agents, etc., are obtained when the starting material has characteristics which fall within a rather narrow range.

The products obtained before hydrolysis according to this invention are probably mixtures of hydrocarbon sulphonyl chlorides and chlor hydrocarbon sulphonyl chlorides, both mono, di and poly, and are useful for preparing a wide variety of derivatives for which purpose the crude reaction mixture or the purified individual compounds may be used. In addition to the hydrolysis and neutralization reactions above described, they may be reacted with alcohols, either alone or in the presence of alkali metals or organic or inorganic bases to yield esters which are useful as plasticizers for cellulose derivatives and resins. Examples of such are the ethyl, butyl and hexadecyl esters.

By reactions of the sulphonyl chlorides with amines alone or in the presence of aqueous alkalies, amides and substituted amides are obtained, which products are useful as plasticizers, petroleum chemicals, and insecticides. Thus, ammonia, dimethylamine, isobutylamine, aniline, cyclohexylamine, n-dodecylamine may be used as reactants.

The products prepared according to the disclosure of this invention thus serve as intermediates for the preparation of numerous derivatives, for example, amides, sulphonyl esters, sulphinic acids, sulphonic acids and water-soluble salts which have surface activity. The hydrolyzed and neutralized compounds disclosed herein, as well as the last mentioned derivatives, may be useful as mercerizing assistants, plasticizers for paints, nitro cellulose lacquers, varnishes, Cellophane, etc., corrosion inhibitors, gum solvents for gasoline, extractants for the refining of gasoline, pour point depressants, insecticides, fly spray ingredients, weed killers, soil fumigants, cotton immunization chemicals, anti-shrinking agents for wool, foaming agents, mold inhibitors, lubricants for steel drawing and metal working, crease-proofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing pastes, the preparation of lakes, the preparation of inorganic pigments and household dye preparations. They may also be useful in improving processes of dyeing leather and textiles including dyeing with de- developed dyes, dyeing in neutral, acid or alkaline dye baths, dyeing of animal fibers with vat dyes, etc. They may also be useful in treating oil wells and to improve flooding of oil bearing sands. They may also be used to improve radiator cleaning compositions, cleansing compositions as household detergent compositions, shampoos, dentifrices, washing of paper mill felts, etc. They may also be used to improve fat liquoring and leather treatment processes as well as for fat splitting agents. They may also be useful in improving the preservation of green fodder. They may also be useful in improving the removal of fibrous layers from surfaces and in metal cleaning. They may also be used to improve flotation processes of ores, pigments, coal, etc. They may also be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may be useful in storage batteries and dry cells. Other uses for these products or their derivatives are as fungicides, accelerators, delusterants, extreme pressure lubricants, moth proofing agents, antiseptics, fire-proofing agents, mildew preventers, penetrating agents, anti-flexing agents, tanning agents, lathering agents, dust collecting agents, antioxidant, color stabilizer in gasoline, etc.

The surface activity of some of the agents may be enhanced by electrolytes or by the addition of other surface-active agents, e. g. alkylated naphthalene sulphonic acids and their water-soluble salts, salts of higher alkyl sulphuric acid esters as described in Bertsch Patents Nos. 1,968,794 to 1,968,797, long chain betaine derivatives both of the C— and N— and open type which are illustrated by Daimler et al. Patent No. 2,082,275, Balle et al. 2,087,565, Platz et al. Patent 2,097,864 and Balle et al. 2,101,524, long chain ammonium, sulphonium and phosphonium compounds, as well as numerous other soap substitutes.

The hydrolysis products or water-soluble salts of the above-described sulphonyl chlorides which have surface active properties may be used in admixture with one another and/or in admixture with soap and/or soap substitutes of the prior art, for various purposes wherein soap and/or soap substitutes have previously been used or are capable of use. A few representative uses are set forth in Reed application, Serial No. 216,332 and it is to be understood that the products produced according to this invention may be substituted in like amount for the products of each of the examples of that case.

As many apparently widely different embodiments of this invention may be made without departing from the spirit and scope thereof, it is to be understood that we do not limit ourselves to the specific embodiments thereof except as defined in the appended claims.

We claim:

1. The process which comprises reacting a purified mixture of predominately aliphatic hydrocarbons having an initial boiling point by the A. S. T. M. method of at least 250° C. and a dry point not greater than 360° C., a Saybolt viscosity of 32 to 52 seconds at 100° F., specific gravity of 0.7610 to 0.8200 at 15.5° C. and a refractive index of 1.4250 to 1.4500 at 20° C., with a gaseous mixture of sulphur dioxide and chlorine.

2. A process as set forth in claim 1, wherein the reaction is carried out in the presence of actinic light at a temperature between 30° and 110° C.

3. The process which comprises reacting a purified mixture of predominately aliphatic hydrocarbons having an initial boiling point by the A. S. T. M. method of at least 250° C. and a dry point not greater than 360° C., a Saybolt viscosity of 32 to 52 seconds at 100° F., specific gravity of 0.7610 to 0.8200 at 15.5° C. and a refractive index of 1.4250 to 1.4500 at 20° C., with a gaseous mixture of sulphur dioxide and chlorine, and hydrolyzing the resulting product.

4. The process which comprises reacting a purified liquid mixture of predominately saturated aliphatic hydrocarbons having an initial boiling point of at least 251° C. and a dry point not greater than 330° C., a Saybolt viscosity of 33 to 45 seconds at 100° F., a specific gravity of 0.7670 to 0.800 at 15.5° C. and a refractive index of 1.4280 to 1.4400 at 20° C., with a gaseous mixture of sulphur dioxide and chlorine.

5. A process as set forth in claim 4, wherein the reaction is carried out in the presence of actinic light at a temperature between 30° and 110° C.

6. A process as set forth in claim 4, wherein the reaction product is hydrolyzed.

7. The process which comprises reacting a purified liquid mixture of predominately saturated aliphatic hydrocarbons having an initial boiling point of at least 260° C. and a dry point of not less than 320° C., a Saybolt viscosity of 35 to 40 seconds at 100° F., a specific gravity of 0.7670 to 0.7800 at 15.5° C., and a refractive index of 1.4300 to 1.4375 at 20° C., with a gaseous mixture of sulphur dioxide and chlorine.

8. A process as set forth in claim 7 wherein the reaction is carried out in the presence of actinic light at a temperature between 30° and 110° C.

9. A process as set forth in claim 7 wherein the reaction product is hydrolyzed.

10. The process which comprises reacting a liquid purified mixture of hydrocarbons in which aliphatic hydrocarbons containing from 13 to 22 carbon atoms predominate, having a boiling point between about 250° C. and about 360° C., a Saybolt viscosity of 32 to 52 seconds at 100° F., specific gravity of 0.7610 to 0.8200 at 15.5° C. and a refractive index of 1.4250 to 1.4500 at 20° C., with a gaseous mixture of sulphur dioxide and chlorine in the presence of actinic light, and hydrolyzing the reaction product.

11. The process which comprises reacting a pure straight chain saturated aliphatic hydrocarbon having a boiling point between about 250° C. and about 360° C., a Saybolt viscosity of 32 to 52 seconds at 100° F., specific gravity of 0.7610 to 0.8200 at 15.5° C. and a refractive index of 1.4250 to 1.4500 at 20° C., with a gaseous mixture of sulphur dioxide and chlorine in the presence of actinic light, and hydrolyzing the reaction product.

12. A mixture of hydrocarbon sulphonyl chlorides obtainable by the process of claim 1.

13. The water-soluble products obtainable by the process of claim 3.

14. The water-soluble products obtainable by the process of claim 10.

15. The water-soluble products obtainable by the process of claim 11.

CLYDE O. HENKE.
WILLIAM H. LOCKWOOD.